United States Patent [19]

Joffe et al.

[11] 4,424,445

[45] Jan. 3, 1984

[54] PORTABLE COATING THICKNESS MEASURING DEVICE

[75] Inventors: Boris B. Joffe, Buffalo; John E. Tiebor, Williamsville; Jerry J. Spongr, Tonawanda; Byron E. Sawyer, North Tonawanda, all of N.Y.

[73] Assignee: Twin City International, Inc., Amherst, N.Y.

[21] Appl. No.: 246,723

[22] Filed: Mar. 23, 1981

[51] Int. Cl.³ ............................................. G01N 23/00
[52] U.S. Cl. .................................. 250/308; 250/358.1
[58] Field of Search .................. 250/308, 358.1, 359.1, 250/360.1; 378/206

[56] References Cited

U.S. PATENT DOCUMENTS 3,529,158  9/1970  Joffe et al. ........................... 250/308
3,720,833  5/1971  Hay ..................................... 250/308
3,767,931  10/1973  Williams ............................. 378/206

Primary Examiner—Davis L. Willis
Attorney, Agent, or Firm—Christel, Bean & Linihan

[57] ABSTRACT

A portable device for measuring coating thickness incorporating a radioactive isotope source and a detector. The device is capable of being readily moved from place to place to measure the thickness of thin film coatings applied to various types of substrates, and incorporates spring means for bringing the isotope source holder into intimate contact with the area to be measured and for holding it in that position. The device also includes a locating system whereby a cross-hair or other image is projected onto the surface of the coating the thickness of which is to be measured, at the point where the source holder would contact the coating surface, permitting extremely accurate locating of the device with respect to the area being measured to thereby facilitate the measuring operation and to permit it to be done in an accurate, speedy, and efficient manner.

15 Claims, 10 Drawing Figures

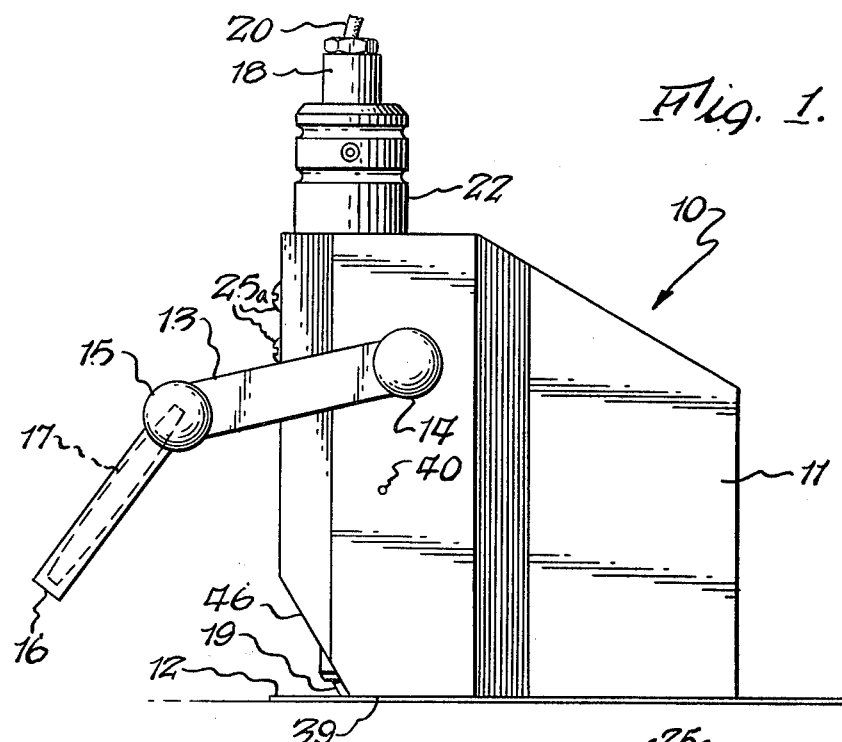
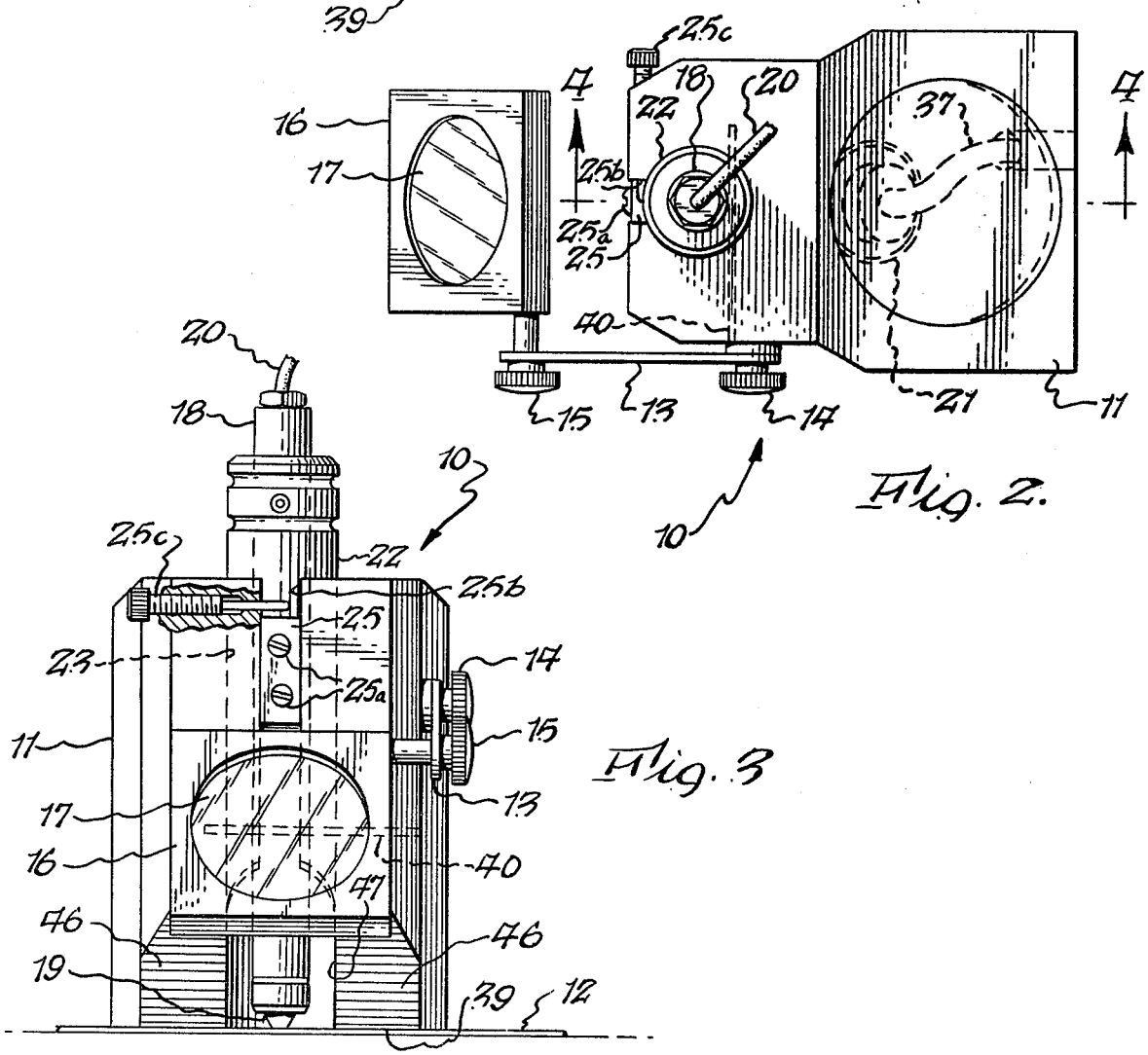

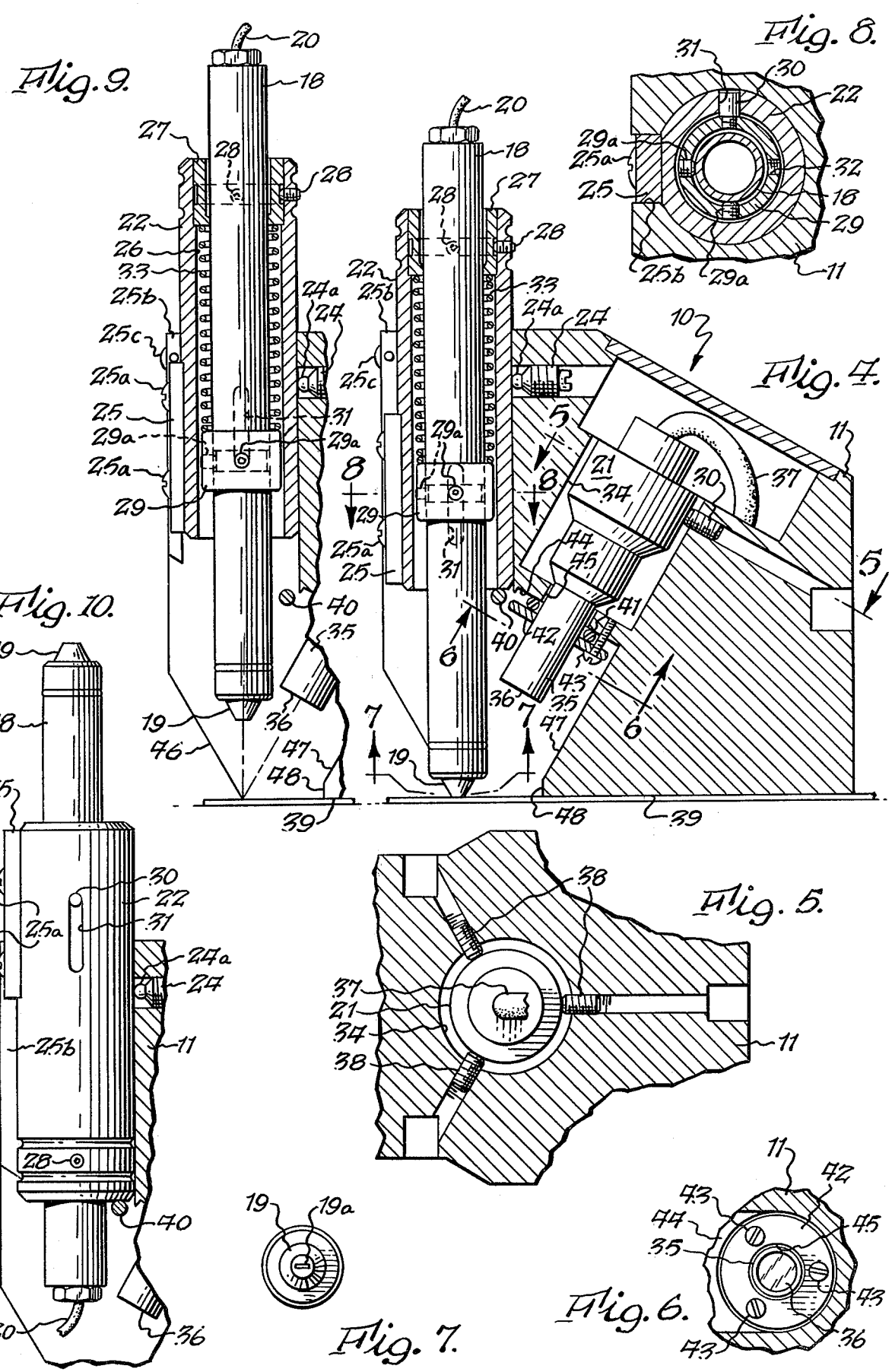

PORTABLE COATING THICKNESS MEASURING DEVICE

BACKGROUND OF INVENTION

This invention relates generally to the measuring art, and more particularly to a new and useful portable measuring device utilizing radiation, such as beta backscatter, for the measurement of ultra thin coating thicknesses and including aligning means for accurately positioning the device with respect to coated areas including, for example, those found on printed circuit boards and the like, in order to facilitate the accurate and rapid measurement of the coating thickness in those areas.

Often the workpiece to be measured is placed on a table which has an apertured support for the workpiece in operative alignment with a radiation source and detector. Where it is either impractical or impossible to position the workpiece on such a table, a portable measuring probe is used, the portable probe being positioned either directly on the workpiece or on a separate supporting surface for such workpiece. U.S. Pat. No. 3,529,158 shows one type of portable probe in which a base member receives a guide for aligning the member with the area to be measured, the guide then being removed from the member and replaced by a measuring head. U.S. Pat. No. 3,720,833 shows another type of portable probe in which a spring biased locator carried by the probe housing is retracted within the housing by a cam arrangement in response to the lowering of a measuring probe unit, also carried by the housing, into engagement with the workpiece.

SUMMARY OF THE INVENTION

It is an object of this invention to provide an improved portable coating thickness measuring device incorporating a radioactive isotope source and detector and which also includes aligning means for accurately positioning the device over the coated area to be measured.

Briefly stated, in accordance with one aspect of the present invention a portable measuring device is provided which includes a housing containing both a radiation source and a radiation detector, and which also includes locating or aligning means for projecting a predetermined image on the surface of the coating area the thickness of which is to be measured. The image can, if desired, be a pair of perpendicularly-arranged cross-hairs and the locator is so positioned as to indicate the precise location where the radiation source holder will contact the coating and where the device will take the thickness measurement, without need for movement of the locator in order to take the measurement. Additionally, biasing means are provided to maintain the radiation source holder operatively engaged with the coated surface for accuracy of measurement.

BRIEF DESCRIPTION OF THE DRAWINGS

FIG. 1 is a side elevational view of a portable probe incorporating the invention.

FIG. 2 is a top plan view thereof.

FIG. 3 is a front elevational view thereof with a portion broken away.

FIG. 4 is a cross-sectional view taken along the line 4—4 of FIG. 2 and showing the several elements of the invention in their operative relationship during the measurement process.

FIG. 5 is a fragmentary cross-sectional view taken along the line 5—5 of FIG. 4.

FIG. 6 is a fragmentary cross-sectional view taken along the line 6—6 of FIG. 4.

FIG. 7 is a partial end view of the measuring probe showing one form of aperture which can be utilized with the probe.

FIG. 8 is a fragmentary cross-sectional view taken along the line 8—8 of FIG. 4.

FIG. 9 is a fragmentary cross-section taken along the line 4—4 of FIG. 2 but showing the measuring probe in its retracted position for aligning the probe system with the coating area to be measured.

FIG. 10 is a fragmentary cross-sectional view showing the measuring probe inverted for calibration purposes.

DESCRIPTION OF THE ILLUSTRATED EMBODIMENT

Referring now to the illustrative embodiment depicted in the drawings, where like numerals designate like parts, and particularly to FIGS. 1, 2 and 3 thereof, there is shown a measuring device 10 of the present invention, the several elements of which are carried in a housing body 11 having sufficient weight to steady the device and to assure firm contact with the surface to be measured. Directly underlying the device is the substrate 12 having a material coated thereon (not shown), the thickness of which is to be measured.

Positioned on the outside of housing body 11 is a link 13, one end of which is connected to housing 11 by means of a threaded knob 14. At the other end of link 13 is another threaded knob 15 which connects to a lens holder 16 within which is positioned a magnifying lens 17 to further facilitate locating of the device over the area which is to be measured. Extending substantially vertically through housing 11 is a measuring head or probe in the form of an inner cylindrical member 18 at the lower end of which is positioned a beta radiation isotope source (not shown) in an apertured source holder 19, and above the source there is positioned a radiation detection means (not shown), which can be, for example, a standard Geiger-Muller tube for detecting radiation backscatter. The output of the Geiger-Muller tube can then be conveyed to a suitable display device (not shown) by means of wire 20. The display device can be a standard meter of known type, or, if desired, it can be a direct digital readout, as will be readily understood by those skilled in the art.

Referring specifically to FIGS. 2 and 4, there is shown a locating or alignment device in the form of a light source housing 21 which is adapted to project a predetermined image on the coated surface the thickness of which is to be measured. The purpose of the image is to precisely locate the area which will be contacted by the lower portion of source holder 19 when it is utilized for taking a measurement. At the time the measurement is taken the area involved is obscured by source holder 19 and therefore is not readily visible. Similarly, when source holder 19 is retracted from the surface to be measured, it is difficult to accurately position the device to assure that the precise area to be measured will be in its proper position with respect to source holder 19. That positioning is accomplished by means of the projection system which forms a part of the present invention.

Cylindrical member 18, which carries the source and the detector, is itself carried in a substantially cylindrical positioning sleeve 22 which is adapted to slide vertically in a cylindrical bore 23 in housing 11. Positioning sleeve 22 is held in a predetermined position within housing 11 by means of friction applied by a setscrew 24 which when turned inwardly forces a ball 24a, which can be made of nylon or other suitable material, against sleeve 22, thereby bringing sleeve 22 into tight, frictional contact with bore 23. A guide block 25 is attached to sleeve 22 by means of screws 25a and rides in axial groove 25b to guide the vertical movement of sleeve 22 and to prevent rotation of sleeve 22 within bore 23. The upward vertical movement of sleeve 22 within bore 23 is limited by a stop screw 25c, the end of which projects into axial groove 25b.

As best seen in FIGS. 4 and 9, positioning sleeve 22 includes an internal bore 26 which receives inner cylindrical member 18 carrying the beta radiation source and the radiation detector. A bushing 27 is positioned within sleeve 22 at the upper end of bore 26 and is held in place by set screws 28. Bushing 27 slidably receives cylindrical member 18 and is arranged to be in snug fitting relationship therewith.

Inner cylindrical member 18 carries an annular collar 29 which is positioned axially thereon by means of setscrews 29a (see FIG. 8). An indexing cap screw 30, which is accessible through an elongated slot 31 in positioning sleeve 22 when cylindrical member 18 and positioning sleeve 22 are removed from housing 11, permits the angular position of cylindrical member 18 to be changed by removing the indexing screw 30, rotating cylindrical member 18 90°, and reinserting indexing screw 30 in threaded hole 32. Such indexing may be required when source holder 19 includes a rectangular aperture 19a, as shown in FIG. 7, in order to accommodate an unusually shaped workpiece (not shown) having an elongated coating area to be measured. A compression spring 33 is positioned around the outer surface of inner cylindrical member 18 between bushing 27 and annular collar 29 and serves to urge inner cylindrical member 18 in a downward direction relative to sleeve 22, the measuring probe being biased against a stop when the sleeve 22 is in its raised position. Thus, the lower end of the slot 31 and set screw 29a establish a stop which restricts downward movement of the probe 18 when the sleeve is in its raised position.

Light source housing 21 is positioned within another bore 34 in housing 11 and includes a light source (not shown) contained in housing 21, to which is attached a housing 35 for the optical system utilized to project the desired pattern on the surface to be measured. Housing 35 extends through a reduced diameter bore 45 through a wall at the lower end of bore 34. The arrangement of the light source and the optical system are well within the knowledge of those skilled in the art and will not be further described herein. At the distal end of the optical system housing is a clear glass member 36 which carries a cross-hair image or such other image as is desired to be projected on the surface to be measured.

The light source is connected to a source of electricity (not shown) by means of a wire 37 and the entire light source and optical system are so positioned within bore 34 as to provide an indication on the surface to be measured of the exact spot which is the center of the area of contact of radiation source holder 19 when it is brought into contact with the surface to be measured. As shown more clearly in FIG. 5, light housing 21 is held in position in bore 34 by means of three substantially equidistantly spaced set-screws 38, which can be adjusted to radially vary the position of light source housing 21 and optical system housing 35 so that the image to be projected intersects the vertical axis of the bore 23 and the plane defined by the lowermost surface 39 of housing 11. An O-ring 41 surrounds member 35, being compressed thereagainst by a washer 42 and screws 43 which clamp ring 41 between washer 42 and the surface 44 of the bore end wall. O-ring 41, provides a resilient bearing to facilitate alignment of the optical system.

As shown in the embodiment illustrated in the drawings, the axes of bores 23 and 34 preferably intersect at the surface to be measured and lie in the same plane, which is the plane of the base of the housing 11.

In operation, housing 11 is positioned over the area to be measured with the central axis of inner cylindrical member 18 approximately overlying the area of interest. The final accurate locating of housing 11 with respect to the area to be measured is accomplished by projecting a cross-hair or other pattern directly on the surface to be measured and moving housing 11 about until the cross-hair pattern is precisely centered on the desired area. The lower front corners of body 11 are removed, as indicated by the downwardly and rearwardly sloping wall portions 46, defining with the bores a recess 47 to facilitate positioning of the device. When that has been done, the device is in proper position for the thickness measurement. During such alignment, positioning sleeve 22 is initially spaced from the substrate 12 and is in the position shown in FIG. 9. Positioning sleeve 22 is then manually moved downwardly, initially to the point at which source holder 19 is in touching relationship with the substrate 12, and it is subsequently moved downwardly to compress spring 33 causing radiation source holder 19 to firmly contact the surface of substrate 12 in the area to be measured. As the sleeve 22 is moved downwardly after initial contact has been established, the spring 33 will be compressed as the set screw 29a moves away from the stop established by the lower end of the slot 31. Thus, as more fully set forth below, the spring establishes the contact pressure between the probe and the workpiece and insures a relatively uniform pressure. Source holder 19 includes a suitably-shaped aperture (not shown) in the portion which contacts the coated area so that the beta radiation can impinge upon the coating and substrate and be scattered back for detection of the backscatter. The measurement is then taken and the device is withdrawn.

Contact between source holder 19 and substrate 12 is maintained by setting positioning sleeve 22 so that set screw 29a is positioned away from the bottom of the slot 31. Spring 33 thus acts on annular collar 29 to urge inner cylindrical member 18 downwardly, thereby maintaining close contact necessary for accurate readings independently of the particular downward position of sleeve 22. In other words, it is necessary only that sleeve 22 be lowered enough for spring 33 to urge holer 19 against substrate 12. Contact pressure is determined by spring 33, and is not dependent upon precise vertical positioning of sleeve 22. The frictional force generated between sleeve 22 and bore 26 by means of ball 24a, the pressure of which is controlled by set screw 24, must be greater than the restoring force set up on in spring 33 in order to sustain the desired close contact. The spring 33 cannot normally be fully compressed when sleeve 22 is moved down, as the sleeve 22 will contact stop 40 before this happens as can be seen from FIG. 4.

Calibration of the device is accomplished by removing positioning sleeve 22 and the inner cylindrical member 18 as a unit from bore 23, inverting it, and reinserting it in bore 23 until positioning sleeve 22 contacts stop member 40. At that point one or more samples having a known thickness of the coating in question are brought into close contact with source holder 29 and a reading taken in order to provide a correlation between the output of the detector and the known coating thicknesses. Alternatively, the calibration of the device can be effected with inner cylindrical member 18 in the working position (pointing downwards) by moving a slide (not shown) carrying a sample having a known thickness of the coating under the cylindrical member 19. When the slide is pushed against the back wall 48 of recess 47, the thickness standard is automatically centered with respect to source holder 19. For the calibration, inner cylindrical member 18 is pushed down until source holder 19 contacts the calibration standard and a reading is taken.

As can be seen from the foregoing description, the present invention provides an improved portable device for measuring the thickness of thin coatings. It is not necessary to move the locator 21 in order to take a measurement once the area to be measured has been precisely located, and contact pressure is maintained independently of a particular lowered position of sleeve 22. Moreover, the device is capable of being very accurately positioned with respect to the point at which the measurement is to be made, all in a simple and durable construction.

While a particular embodiment of the invention has been illustrated and described, it will be apparent to those skilled in the art that various changes and modifications can be made without departing from the spirit and scope of the invention, and it is intended to cover in the appended claims all such changes and modifications that are within the scope of this invention.

What is claimed is:

1. A portable coating thickness measuring device utilizing radiation, said device comprising:
    a housing having a base, a first bore perpendicular to the plane of said base, and a second bore, the axis of which intersects the axis of the first bore at a point in the plane defined by the base of said housing;
    a probe assembly slidably positioned in said first bore for vertical movement therein between a raised position and a lowered position wherein the lower end of the probe is in contact with the coating to be measured in order to provide radiation backscatter therefrom;
    a radiation source housed in said probe assembly;
    a radiation detection system housed in said probe assembly and capable of sensing said radiation backscatter and providing a suitable signal indicative of the thickness of the coating; and
    means for projecting a predetermined image directly onto the surface to be measured and at a point aligned with the lower end of the probe, whereby to permit accurate positioning of the probe assembly with respect to the coated area the thickness of which is to be measured, said image projecting means being positioned in said second bore;
    said probe assembly further comprising an inner cylindrical member housing said radiation source and said detection system, said inner cylindrical member being slidably disposed within a substantially annular, outer positioning sleeve, which, in turn, is slidably disposed within said first bore of said housing.

2. The thickness measuring device of claim 1 wherein a portion of the inner surface of said outer cylindrical member has a diameter greater than the outer diameter of said inner cylindrical member and includes an inwardly projecting shoulder at one end thereof, said inner cylindrical member having a stop member disposed on its outer surface, and a spring member positioned around the periphery of said inner cylindrical member between said stop member on said inner cylinder member and said inwardly projecting shoulder of said outer cylinder member, whereby to urge said inner cylindrical member outwardly from said outer cylindrical member.

3. The thickness measuring device of claim 2 wherein said image projecting means includes a light source, a lens system, and means for carrying the image desired to be projected.

4. The thickness measuring device of claim 3 wherein the image is a pair of intersecting perpendicular lines.

5. The thickness measuring device of claim 2 wherein the lower end of said probe is provided with a elongated aperture through which radiation can pass, and wherein said inner cylindrical member carries means for rotationally adjusting the position of said inner cylindrical member whereby to permit proper orientation between said aperture and the surface to be measured.

6. A portable coating thickness measuring device utilizing radiation, said device comprising:
    a housing having a base, a first bore perpendicular to the plane of said base, and a second bore, the axis of which intersects the axis of the first bore at a point in the plane defined by the base of said housing, said housing being movably positionable upon said coating;
    a probe assembly slidably positioned in said first bore for vertical movement therein between a raised inoperative position and a lowered operative position where the lower end of the probe is in contact with said coating;
    a radiation source housed in said probe assembly and capable of providing radiation backscatter when the probe assembly is in its lowered operative position;
    a radiation detection system housed in said probe assembly and capable of sensing said radiation backscatter and providing a suitable signal indicative of the thickness of the coating; and
    means for projecting a predetermined image directly onto the surface to be measured and at a point aligned with that position occupied by the lower end of the probe when it is in its lowered position, whereby accurate positioning of the device is permitted with respect to the coated area the thickness of which is to be measured, said image projecting means being positioned in said second bore entirely outside of the path of movement of said probe assembly to permit uninterrupted free movement of the probe assembly as it moves between its raised and lowered positions.

7. A portable thickness measuring device utilizing radiation and capable of measuring the thickness of a coating mounted upon a substrate to form an assembly, said device comprising:
    a housing having a substantially planar base movably positionable upon an assembly of a coating and a substrate;

a measuring probe carried by said housing and movable between a raised inoperative position and a lowered operative position where the lower end of the probe is in contact with said assembly, said probe utilizing radiation and capable, when in contact with said assembly, of generating a signal indicative of the thickness of the coating; and means carried by said housing for projecting a predetermined image directly on the surface of the coating to be measured at a point aligned with that position occupied by the lower end of the probe when it is in its lowered position to permit accurate positioning of the probe with respect to that portion of the assembly which is to be measured, said means being disposed entirely outside of the path of movement of said probe to permit uninterrupted free movement of the probe as it moves between its raised and lowered positions.

8. The portable thickness measuring device as set forth in claim 1 wherein said housing is provided with a vertically extending bore, said measuring device further including a sleeve movable vertically within said bore between a raised position and a lowered position, said sleeve being provided with a stop, and said measuring probe being carried by said sleeve for relative vertical movement thereto, said probe normally being biased downwardly against the stop when the sleeve is in its raised position but being spaced away from said stop when the sleeve is in its lowered position.

9. The measuring device as set forth in claim 8 wherein spring means are disposed between said sleeve and said measuring probe, said spring means normally biasing said probe against said stop when the sleeve is in its raised position.

10. The measuring device as set forth in claim 9 wherein said spring is disposed between first and second collars, one of said collars being disposed inwardly of said sleeve at its upper end thereof and being secured thereto, and the other of said collars being disposed outwardly of said measuring probe and being secured to an intermediate portion thereof.

11. The measuring device as set forth in claim 8 wherein said stop includes a vertically extending slot in said sleeve, the probe having a pin received with said slot.

12. The measuring device as set forth in claim 8 wherein friction means are disposed between said sleeve and said bore, said friction means establishing a frictional force which is greater than the force which normally biases the probe downwardly against the stop whereby the sleeve can be positioned in a lower position with said probe being spaced away from said stop.

13. The measuring device as set forth in claim 8 wherein the probe is normally biased downwardly by spring means, said spring means acting between said movable sleeve and said measuring probe, and further characterized by the provision of another stop which limits the downward movement of said sleeve to prevent full compression of said spring means.

14. The measuring device as set forth in claim 7 wherein said housing is provided with a vertical bore and a further bore, the axis of the vertical bore and said further bore intersecting in the plane of the base of the housing, said measuring probe being disposed in said vertical bore, and the means for projecting the predetermined image being disposed in said further bore.

15. The measuring device as set forth in claim 14 wherein said last mentioned means includes a light source, a lens system, and means for carrying the image desired to be projected.

* * * * *